March 11, 1969 I. KALNS Re. 26,540

BI-DIRECTIONAL NO-BACK DRIVE DEVICE

Original Filed Oct. 23, 1965 Sheet 1 of 2

INVENTOR
ILMARS KALNS
BY Whittemore, Hulbert & Belknap
ATTORNEYS

BI-DIRECTIONAL NO-BACK DRIVE DEVICE

Original Filed Oct. 23, 1965

INVENTOR.
ILMARS KALNS
BY Whittemore, Hulbert & Belknap
ATTORNEYS

United States Patent Office

Re. 26,540
Reissued Mar. 11, 1969

26,540

BI-DIRECTIONAL NO-BACK DRIVE DEVICE

Ilmars Kalns, Taylor, Mich., assignor to Formsprag Company, Warren, Mich., a corporation of Michigan Original No. 3,335,831, dated Aug. 15, 1967, Ser. No. 503,381, Oct. 23, 1965. Application for reissue Nov. 21, 1967, Ser. No. 689,738
U.S. Cl. 192—8 26 Claims
Int. Cl. F16d *57/10, 67/00;* B60t *7/12*

Matter enclosed in heavy brackets [ ] appears in the original patent but forms no part of this reissue specification; matter printed in italics indicates the additions made by reissue.

*ABSTRACT OF THE DISCLOSURE*

*A bi-directional no back drive device, in one embodiment, consisting of a fixed brake drum and dual brake shoes disengaged from the brake drum by drive pins and wedgeable into engagement with the drum by pivotable pins connected to the output. The driven pins are caused to move in a non-rotative path during the braking phase of operation. Other embodiments include a rotatable rather than fixed brake drum, a single drive wedging member to replace the pivotable pins, and a dual input to replace the single drive source.*

The present invention relates to improvements in a bi-directional no-back drive device adapted to transmit driving torque from a driver or input member in either rotative direction to a driven or output member, while instantaneously grounding or braking out a feed-back torque in either rotative direction from the output side to the inputside.

It is an object of the invention to provide a so-called no-back or anti-reverse feed-back device of this character which is extremely simple in the design and assembly of relatively few compact parts, thus suiting the improvement for inexpensive mass production.

Another object is to provide a unit or device as described which, in the driving, input-to-output phase, has simple means for instantaneously de-braking the device by shifting one or more brake shoes thereof out of frictional engagement with a fixed brake or ground member, race or drum. Thereafter, the drive of the output member from the input side is carried out through the agency of the brake shoe means, as positively coupled drivingly between the input and output members. As herein disclosed, the input power is transmitted from the driver to a shoe through the agency of an axially projecting pin thereon spaced from and in a plane including the rotative axis thereof, and brake energizing action is transmitted from the driven member to the shoe through the agency of another pin on said member, also spaced from the rotative axis and in a plane including the latter, but at a substantial angle to the first named plane.

In further accordance with the invention, the instantaneous release of the brake shoe means from the ground or brake drum is effected through an arrangement of a pin or pins received with side clearance in a corresponding number of larger diameter, eccentric hole or holes in each of a pair of segmental shoes. Thus, upon initial movement in a driving direction, the pin wedges up on what amounts to a cylindrical ramp surface of the hole in the shoe, so that the latter is wedged radially inwardly in relation to a fixed cylindrical brake drum, hence out of effective braking engagement with the latter. The motions may be very small, indeed, but the augmented brake-loose effort, due to the pin and ramp's mechanical advantage, makes it possible to break engagement with the drum, by manual effort alone, under frictional torque resistance of hundreds of food pounds.

In further accordance with the invention, the invention contemplates anti-feedback means on the output member which acts upon the brake shoes in a different fashion, the instant that the output or driven member tends to exert reverse driving torque. In this case, such reverse torque is transmitted instantaneously and directly to the brake shoes, preferably by pin means drivingly connected to the output member to force the shoes radially outwardly into instantaneous wedging and locking engagement with the brake or ground drum.

In accordance with this preferred embodiment of the invention, the pin means referred to, as drivingly connected to the output member, takes the form of a pair of pins having ball type heads received in two holes of said member on opposite sides of its axis of rotation. The opposite ends of the pins are received in mating relation between pairs of opposed, approximately semi-cylindrical recesses in the brake shoes on approximately diametral, parallel surfaces at which the shoes face one another. Thus, as the pins travel in the reverse feed-back direction with the driven member, they act directly, and each in two opposite circumferential directions (due to the swiveling of the pin heads in the output member holes) upon each of the respective shoes thus forcing one thereof radially outwardly against one-half of the brake drum surface, and the other oppositely against the other half, under a very effective force couple at each pin and its mating shoe recesses.

In another, somewhat less desirable but useful, embodiment, the action to spread the shoes against the drum and block reverse feedback is exerted by an axially extending tang projection on the output or driven member which is of non-circular cross section, i.e., which has a pair of opposed flats engaging facing parallel surfaces of the brake shoes to exert opposite shoe spreading and brake drum gripping forces.

As illustrated herein, the no-back provisions of the invention may be associated in a simple type of bi-directional drive unit, or may be incorporated in a more complex sort of manual override device, such as is the subject matter of a copending application of Giovan B. Candela, Ser. No. 431,589, filed Feb. 10, 1965, now abandoned, in which either a normal servo drive of an output member, or a manual override drive, is made subject to the pin-type of brake shoe connections referred to above.

In further accordance with the invention, a suitable simple provision is contemplated to center the brake shoes in a neutral position after input-output driving has commenced. As herein disclosed, such centering means may take the form of a pin or pins fixedly carried on each brake shoe and each protruding into an oversize hole in the input or driving member, with the space between pin and hole filled by an appropriate sleeve-like elastic element.

The foregoing as well as other objects will become more apparent as this description proceeds, especially when considered in connection with the accompanying drawings, illustrating the invention, wherein.

Figure 7:
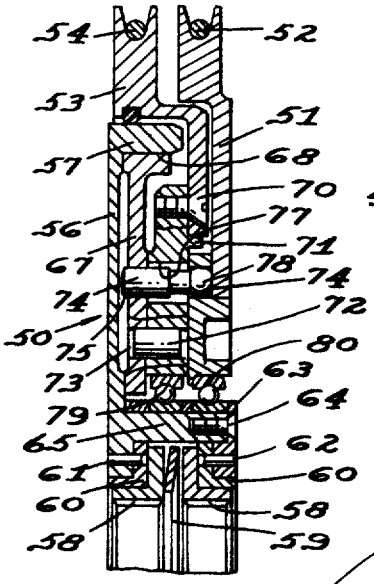
Figure 6:
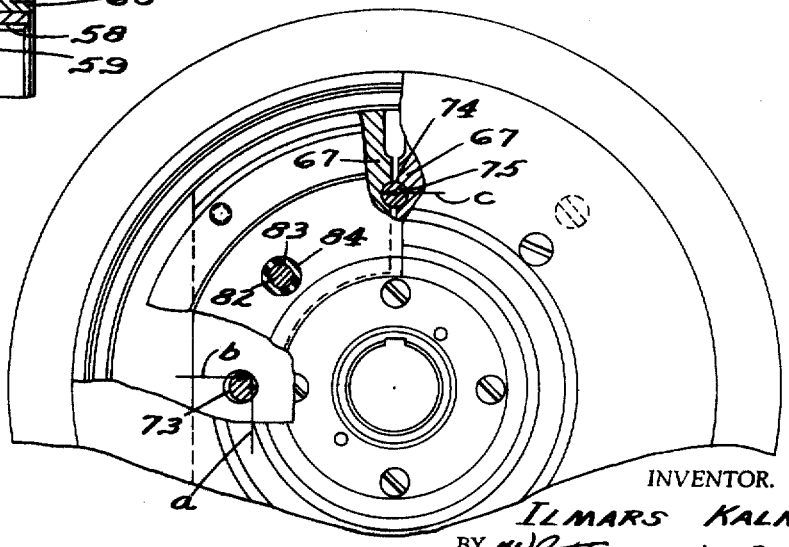

FIG. 6 is a fragmentary end elevational view, partially broken away and sectioned in transverse planes normal to the drive axis, of another embodiment of the invention in a manual override type of device such as is the subject matter of the Candela application identified above; and FIG. 7 is a fragmentary view in axial section through the device of FIG. 6, FIG. 7 showing certain brake release and re-engaging pins which are actually in planes at 90° to one another.

Figure 1:
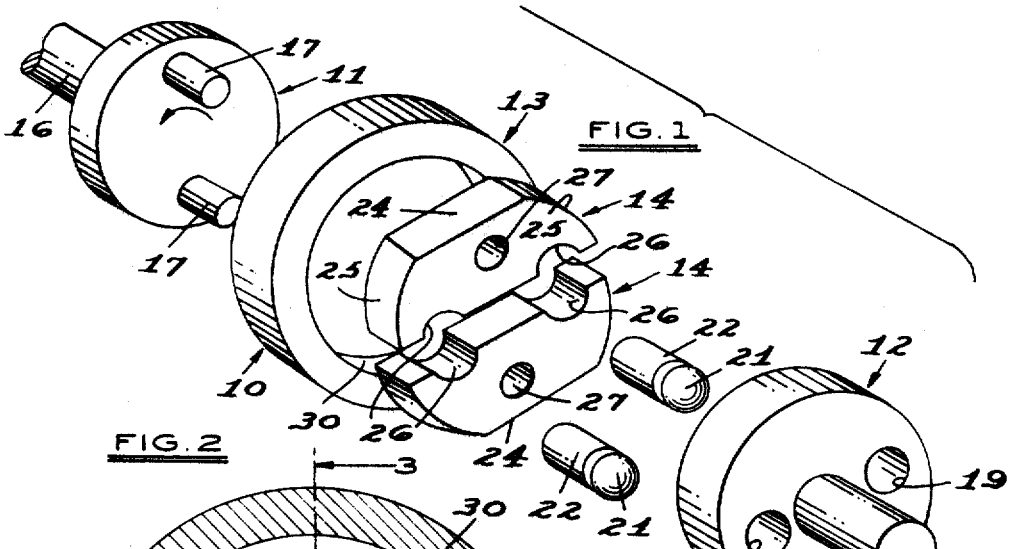
FIG. 1 is a fragmentary exploded view in perspective, more or less schematically illustrating component driving, brake shoe and drum, and driven components of the improved device, in a preferred embodiment thereof.
Figure 2:
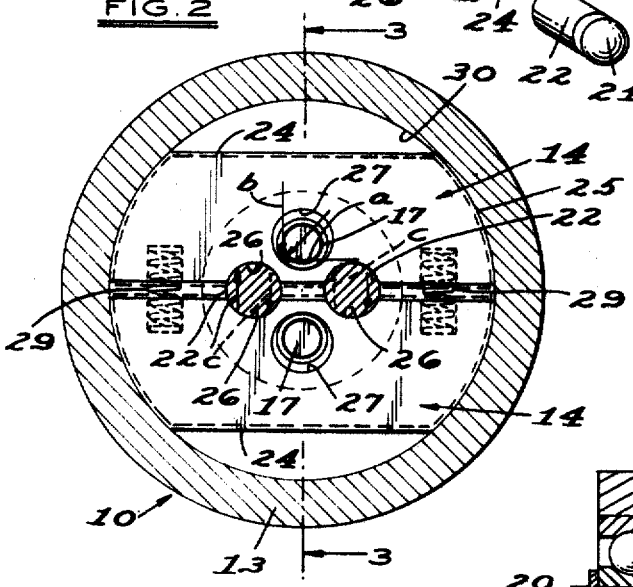
FIG. 2 is a view in transverse cross section, as along line 2—2 of FIG. 3, in a plane at 90° to the axis of the device, directional forces and force vectors being indicated by arrows, and braking and brake release positions of the brake shoes indicated in solid and dotted lines, respectively.
Figure 3:
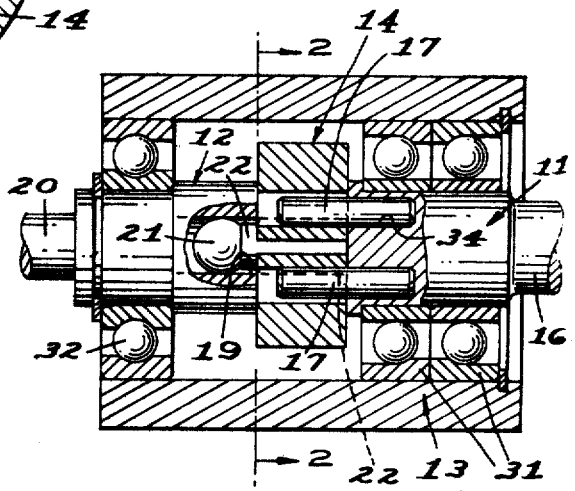
FIG. 3 is a view in axial section on line 3—3 of FIG. 2 but in a slightly reduced scale.

First referring to FIG. 1 of the drawings, illustrating basic components of a preferred embodiment of the invention, the principle of which is employed in toto in the embodiment of FIGS. 2 and 3 and also in that of FIGS. 6 and 7, a no-back driving unit, generally designated 10, comprises basically the driving or input member 11, a coaxial driven or output member 12, a fixed cylindrical brake drum or race 13, and a pair of identical but reversely oriented frictional brake shoes 14 adapted to engage the inner cylindical surface of drum 13 to prevent reverse rotative feedback in either direction from the output member 12.

The input member is powered from a suitable shaft 16 fixedly connected thereto; and has a pair of parallel, axially projecting drive pins 17 fixedly secured thereto on the opposite diametral sides of its axis and that of shaft 16. The driven member 12 is provided with a pair of throughholes 19 on diametrically opposite sides of its axis and that of a driven shaft 20 central thereof. Holes 19 are adapted to receive the quasi-spherical ball heads 21 of a pair of reverse feed-back control pins 22.

The brake shoes 14 are each of segmental, semi- or quasi-cylindrical character, outlined by a flat outer chordal surface 24 intersecting at its ends the arcuate frictional braking surfaces 25, which are constructed as parts of a theoretical cylinder centered at the axis of rotation of the unit 10. Each shoe 14 has an inner flat area of approximately diametral extent, insofar as the shoe surfaces 25 are concerned; and each such surface is provided, on opposite sides of its axial center line, with an approximately semi-cylindrical recess or seat 26. Likewise, each shoe 14 has, in an axially extending plane centered between its pair of recess 26, a through-hole 27 spaced inwardly of its flat inner surface 25. FIG. 1 suffices to show quite schematically the basic components described above, on the understanding that they are to be supplemented by energizing and mounting means of the character shown better in a structural way in FIGS. 2 and 3 of the drawings.

As therein shown, the opposing, laterally spaced inner surfaces of each of the brake shoes 14 are recessed to pilot a pair of small compression springs 29, by which the shoes are normally urged radially oppositely into slot engagement with one-half of the inner cylindrical brake surface 30 of the fixed brake drum 13. As also shown in FIG. 3, the right-hand input member 11 is coaxially journaled within drum 13 by means of a pair of ball bearings 31 taking axial and radial load; while the output or driven member 12 is journaled adjacent the opposite end of drum 13 by a ball bearing 32. In a typical production design, the driving or brake release pins 17 of input member 11 will be forced-fitted into parallel partial bores 34 in the inner face of that member.

As illustrated in FIGS. 2 and 3, the through-holes 27 of brake shoes 14 are of appreciably larger diameter than the pins 17 of input member 11 which are received therein, with an eccentricity of the holes 19 being disposed radially outwardly of the pins (FIG. 2). On the other hand, with the ball heads 21 of the output member's driving and brake engaging pins 22 received with a snug, though not tight, fit in the through-holes 19 of output member 12, the remainder of each of these pins has a close mating fit within the space between one of each of the pairs of opposed recesses 26 of the brake shoes 14. Accordingly, it is seen that the pin 22, as thus closely engaged in said recesses, may have a slight swivel action at its ball head 21, for a purpose and advantage to be described.

Thus, in operation, reference being particularly had to FIG. 2, assuming that the driver or input member 11 (in the direction toward which the viewer faces) is driving in a counterclockwise direction, an instantaneous effect is for its driving and brake release pins 17 to ride up ever so slightly, on an arcuate ramp represented by the cylindrical surface of the larger diameter, eccentric hole 27, in the direction of the rotative drive, instanced as counterclockwise.

Accordingly, an inwardly inclined force is exerted on this effective ramp surface, as indicated in FIG. 2, the vector components of which are indicated at a, a horizontal one, and at b, a 90°, radially inward one, which has the effect of wedging or camming the shoe 14 out of frictional engagement with the brake drum surface 30, i.e., from the solid line position to the dotted line position in FIG. 2. Of course, the extent of the radial, releasing shift is minimal and exaggerated in FIG. 2, but sufficient to entirely free the shoes 14 from frictional retardation by drum 13. Drive of output member 12 and its shaft 20 through the agency of the pins 17, shoes 14, pins 22, then ensues.

On the other hand, should a reverse feed-back torque arise at driven member 12, its holes 19, snugly engaging the ball heads 21, of the drive and brake engaging pins 22, shift the latter in opposite, purely circumferential directions; and the effect of such shift is to rock each pin about its ball head 21 as a fulcrum. Thus, as illustrated by the solid and dotted line arrows in FIG. 2, each pin will engage one of the shoe recesses 26 in which it is received in one spreading direction, as indicated by solid and dotted line arrows c in FIG. 2, and the other such recess 26 in the opposite spreading direction. Accordingly, the shoes 14 are instantaneously subjected to a pair of force couples, adjacent opposite axial ends of the recesses 26, as suggested by the solid and dotted line arrows of FIG. 2; and the shoes 14 are spread under a considerable mechanical force advantage into gripping and clamping engagement with the brake surface 30 of fixed drum 13. The braking action is strong, but just as soon as the reverse feed-back effect ceases the drive and brake release pins 17 come into play to de-brake the unit 10, also under the wedging, ramp-type mechanical advantage discussed above.

Figure 4:
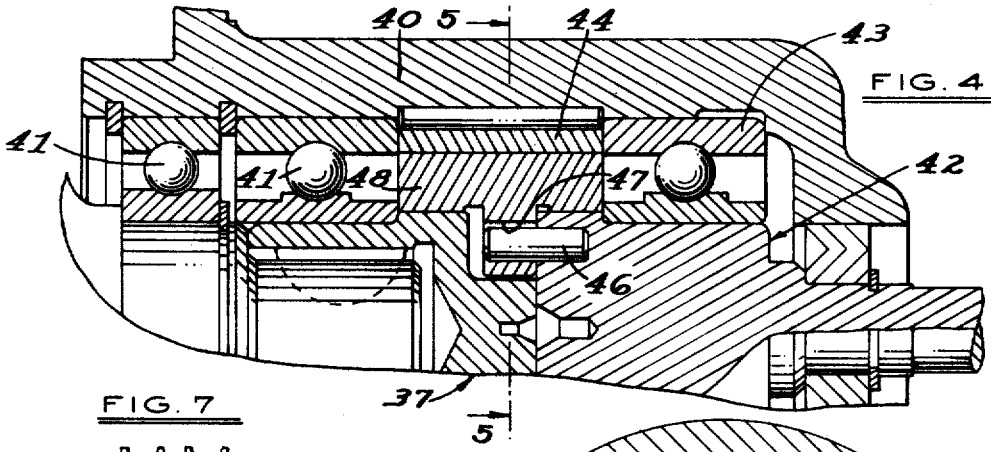
FIG. 4 is a fragmentary view in axial section through a device incorporating a somewhat different type of anti-reverse braking action than the device of FIGS. 2 and 3.
Figure 5:
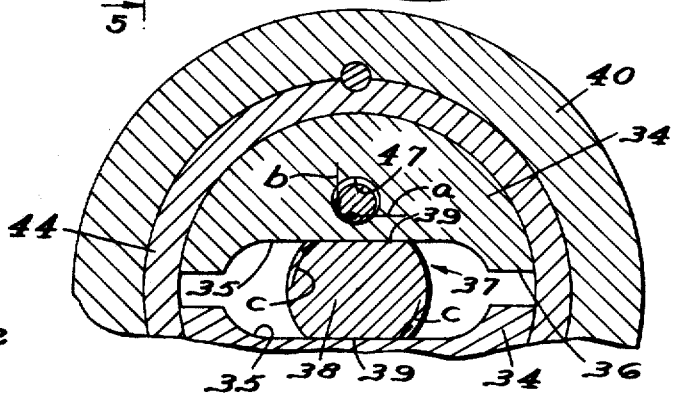
FIG. 5 is a fragmentary view in transverse vertical section on line 5—5 of FIG. 4.

FIGS. 4 and 5 of the drawings illustrate a modified embodiment of the invention, operating under the wedge ramp principle of the embodiment of FIGS. 1–3, but with a different type of feed-back braking effect.

In this form, the shoes, designated 34, are shown as formed with flat surfaced recesses 35 intermediate the ends of opposed, transversely spaced inner flats 36; and the output member, generally designated 37, is provided with a non-circular integral, axially extending projection or tang 38 having opposed flats 39 in engagement with the shoe surfaces 35. As shown in FIG. 4, the output member 37 is journaled in a housing 40 by ball bearings 41; while the input member, generally designated 42, is similarly journaled by a ball bearing 43. The fixed brake drum, proper, is in the form of a ring 44 pinned against rotation in housing 40.

Input member 42 is equipped with a pair of diametrically spaced drive and brake release pins 46, as in the first described embodiment, which are received in eccentric holes 47 of the brake shoes 48, also as in the first embodiment; and the action of pins 46 in instantaneously releasing the shoes 48 from braking engagement is the same as described in connection with that form.

Upon the occurrence of a reverse, feed-back torque at driven member 37, the effect is that its flatted tang 38 thrusts against the shoe surface 35 in opposite directions, as indicated by the arcuate arrows c in FIG. 5, thus thrusting shoes 34 radially outwardly for braking action.

FIGS. 6 and 7 illustrate the principles of the invention as embodied in a manual override type of driving mechanism 50, generally similar to the mechanism illustrated and described in the above-identified Candela application. As in the latter, it may be utilized to afford a manual override operating control by an aircraft pilot of any one or more of multiple aircraft engine fuel supply devices, which are normally operated by servo-motors. In such an adaptation, the invention affords an automatic, instantaneous braking of either a servo-drive input member, or a pilot-operated manual override input member, in the event the output side develops a reverse feed-back torque in either rotative direction.

Referring to FIGS. 6 and 7, as in the Candela application, the normal output member is in the form of a pulley disc 51 to which a cable 52 is secured. It is to be understood that there is one device or mechanism 50 for each of the control fuel supply or other controlled devices; and the cable 52 is connected to an operating part of such device.

A manual override pulley disc, partially nested within output disc 51, is designated 53, and also has a cable 54 associated therewith which is controlled by the pilot or operator. A second input member or disc 56 will typically be operated normally by a servo-motor (not shown); and disc 56 has an axially inwardly extending annular flange 57, which serves as a brake drum of the mechanism 50. Input disc 56 is frictionally driven by a pair of splined rings 58 from the servo or other prime mover, the rings 58 being drivingly coupled by an interposed Belleville spring 59. Rings 58 are frictionally engaged by angle-section drive rings 60, one of which is connected by a pin 61 to disc 56, and the other of which is connected by a pin 62 and ring 63 secured by a screw 64 to an annular flange 65 of disc 56.

As shown in FIG. 6, the brake shoes 67 of the device 50 are separated along an upright plane from one another and are adapted for radial outward braking engagement with an inner brake drum surface 68 of input disc flange 57. The manual override pulley 53 is bolted at 70 to an input disc 71 which, in a radially inner zone, carries axially extending drive and brake control pins 72, these pins projecting into oversize, eccentric openings 73 in the shoes 67, corresponding to the openings 27 and 47, respectively, of the earlier described embodiments; and the action of these pins, when the input member in manually override-driven by pulley 53, is the same wedgenig, mechanical advantage action previously described.

In further outward zones, the shoes receive the brake engaging and output drive pins 74 in recesses 75 in the facing shoe surfaces (FIG. 6); and pins 74 project axially to the right (FIG. 7) through relatively large size openings 77 in input disc 71 to the ball-shaped head ends 78 of the pins, which head ends are received in openings 79 of the output pulley 51. Input disc 71 and pulley 51 are journaled by ball bearings 79, 80, respectively, on the flange 65 of servo-input disc or member 56.

In an installation in a manual override system such as has been mentioned, the extent of rotation of neither the manual override pulley 53 nor the output pulley 51 will exceed 180°, although the principles may be incorporated in a drive structure of the type of FIGS. 1–3 or 4, 5 in which continued rotation of the output member is contemplated. In normal, servo-motor operation, assuming that the output pulley cable 52 is pulled taut, representing a reactive force, the result is that the ball headed pins 74 are swiveled in the recesses 79 of the output pulley 51; and the pins 74 consequently exert force couples, in each instance, on the brake shoes 67 to spread the latter into gripping engagement with the internal drum surface 68 of the servo-driven input power disc 56. As thus coupled, the shoes 67 drive output pulley 51 from disc 56 through the agency of the power input pins 72 and power output pins 74.

When the operator desires to make a manual override operation, he tensions cable 54, thus shifting pulley 53 angularly, the large size opening 77 in the pulley-connected member 71 permitting this shift. As a consequence, pins 72 are moved up the eccentric arcuate ramp surfaces of the holes 73 in the brake shoes 67; and the latter are retracted from the brake surface 68 under a mechanical advantage, just as described in reference to the earlier embodiments. Drive continues to the output pulley 51 through the agency of pins 72, brake shoes 67 and driven pins 74, in the manner also described previously.

As illustrated in FIG. 6, the embodiment 50 of the invention includes means to normally center the shoes 67 in a neutral position during the servo-operated driving phase of the device. For this purpose, each shoe has an axially extending pin 82 press-fitted therein and protruding through an oversize hole 83 in the input disc, with the space between pin and hole filled by an appropriate elastomeric material 84, such as neoprene. Thus, upon brake release for driving, the elastic material shifts the shoes 67, through the agency of pins 82, to a neutral intermediate position, and normal drive of device 50 from the servo input resumes.

It is seen that the invention affords various embodiments of bi-directional no-back or anti-reverse feed-back device, in which input power is transmitted to an output through the agency of coacting brake shoes, input pins and output pins, affording mechanical advantage brake release wedging action and brake engaging force couple action which multiply both the break-free effect on the shoes, as well as the brake engaging effect. The devices are relatively simple in construction, and readily produced, lending themselves to inexpensive mass production.

*The improvement affords a combined torque transmission and excess torque lock-out unit, in which the pin-type drive means, typically including the pins 22 of FIGS. 1–3, as operatively connected to one of the input and output members, shown as the latter, not only participate in the line of transmission between the members, traveling in a rotative path about the axis of the unit in this phase, but they also participate in the locking or grounding-out of an excessive resistive load torque above the normal input or drive torque. In this action they act in a manner otherwise than rotatively about the axis, i.e., they tilt or rock against the shoe members 14 to engage the latter with the cylindrical braking surface 30. The line of normal force transmission is shown as being completed by other pin means 17 at the input end of the unit; however, irrespective of this the novel combined rotative and rocking action of the power transmitting pin elements contributes to a compact, low cost and efficient construction.*

*With specific reference to the manual override adaptation of the invention illustrated in FIGS. 6 and 7, the action of the resilient restoring or returning means of that unit, shown in FIG. 6 as embodying further pin means 82 on the brake shoe received in an enlarged hole 83 in the manual override input disk, with a sleeve 84 of elastic material interposed, this feature is also of essential importance, insuring that, instantaneously with the cessation of manual override control, the unit is in a condition to resume normal servo-originated torque transmission, with no possibilty of freezing in the manual override setting.*

What I claim as my invention is:

[1. An antireverse feed-back device, comprising means providing a circular brake surface, a rotary input member coaxial with said surface and having a drive and brake control pin projecting therefrom in laterally spaced relation to the rotative axis thereof, a brake shoe releasably engageable in braking relation to said brake surface, said shoe having a hole of larger diameter than said pin eccentrically receiving and being wedged by the latter to urge the shoe out of said braking relation in a driving phase of said input member and pin, and an output member coaxial with said input member and having a driven and brake control element projecting axially thereof and engageable with said shoe to urge the latter to said braking relation in a phase of operation of the device in which the output member is under torque in a direction reverse of the direction of the input member driving phase.]

[2. A device in accordance with claim 1, in which said output member element comprises an axially projecting pin in driving engagement with said output member and spaced laterally from the rotative axis of the latter.]

3. *An anti-reverse feed-back device, comprising means providing a circular brake surface, a rotary input member coaxial with said surface and having a drive and brake control pin projecting therefrom in laterally spaced relation to the rotative axis thereof, a brake shoe releasably engageable in braking relation to said brake surface, said shoe having a hole of larger diameter than said pin eccentrically receiving and being wedged by the latter to urge the shoe out of said braking relation in a driving phase of said input member and pin, and an output member coaxial with said input member and having a driven and brake control element projecting axially thereof and engageable with said shoe to urge the latter to said braking relation in a phase of operation of the device in which the output member is under torque in a direction reverse of the direction of the input member driving phase,* [A device in accordance with claim 1, in which] said output member element comprises an axially projecting pin in driving engagement with said output member and spaced laterally from the rotative axis of the latter, said last named pin having a rounded end and said output member having a recess receiving said pin end in a swiveling and driving relation thereto, said shoe being engageable by said pin in said reverse torque operating phase to urge the shoe to said braking relation to said brake surface.

[4. A device in accordance with claim 1, in which said output member element comprises a tang on said member having a flat surface wedgingly engageable with said shoe.]

5. An anti-reverse feed-back device, comprising means providing a circular brake surface, a rotary input member coaxial with said surface and having a drive and brake control pin projecting therefrom in laterally spaced relation to the rotative axis thereof, a brake shoe releasably engageable in braking relation to said brake surface, said shoe having a hole of larger diameter than said pin eccentrically receiving and being wedged by the latter to urge the shoe out of said braking relation in a driving phase of said input member, and an output member coaxial with said input member and having at least two driven and brake control elements projecting axially therefrom in radially spaced relation to the axis thereof, said elements being engageable with said shoe to urge the latter to said braking relation in a phase of operation of the device in which the output member is under torque in a direction reverse of the direction of the input member driving phase, said output member elements each comprising a projecting pin in driving relation to said output member.

6. An anti-reverse feed-back device, comprising means providing a circular brake surface, a rotary input member coaxial with said surface and having at least two drive and brake control pins projecting therefrom in laterally spaced relation to the rotative axis thereof, at least two brake shoes releasably engageable in braking relation to said brake surface, said shoes each having a hole of larger diameter than said pin eccentrically receiving and being wedged by the latter to urge the shoes out of said braking relation in a driving phase of said input member and having at least two driven and brake control elements projecting axially therefrom in radially spaced relation to the axis thereof, said elements being engageable with said shoes to urge the latter to said braking relation in a phase of operation of the device in which the output member is under torque in a direction reverse of the direction of the input member driving phase, said output member elements each comprising a projecting pin in driving relation to said output member.

7. An anti-reverse feed-back device, comprising means providing a circular brake surface, a rotary input member coaxial with said surface and having a drive and brake control pin projecting therefrom in laterally spaced relation to the rotative axis thereof, a brake shoe releasably engageable in braking relation to said brake surface, said shoe having a hole of larger diameter than said pin eccentrically receiving and being wedged by the latter to urge the shoe out of said braking relation in a driving phase of said input member, and an output member coaxial with said input member and having at least two driven and brake control elements projecting axially therefrom in radially spaced relation to the axis thereof, said elements being engageable with said shoe to urge the latter to said braking relation in a phase of operation of the device in which the output member is under torque in a direction reverse of the direction of the input member driving phase, said output member elements each comprising a projecting pin in driving relation to said output member, said last named pins each having a rounded end and said output member having recesses receiving said pin ends in a swiveling and driving relation thereto, said shoes being engageable by said pins to exert force couples on the shoes in said reverse torque operating phase to urge the shoes to said braking relation to said brake surface.

8. An anti-reverse feed-back device, comprising means providing a circular brake surface, a rotary input member coaxial with said surface and having at least two drive and brake control pins projecting therefrom in laterally spaced relation to the rotative axis thereof, at least two brake shoes releasably engageable in braking relation to said brake surface, said shoes each having a hole of larger diameter than said pin eccentrically receiving and being wedged by the latter to urge the shoes out of said braking relation in a driving phase of said input member, and an output member coaxial with said input member and having at least two driven and brake control elements projecting axially therefrom in radially spaced relation to the axis thereof, said elements being engageable with said shoes to urge the latter to said braking relation in a phase of operation of the device in which the output member is under torque in a direction reverse of the direction of the input member driving phase, said output member elements each comprising a projecting pin in driving relation to said output member, said last named pins each having a rounded end and said output member having recesses receiving said pin ends in a swiveling and driving relation thereto, said shoes being engageable by said pins to exert force couples on the shoes in said reverse torque operating phase to urge the shoes to said braking relation to said brake surface.

[9. The device of claim 1 in which said brake surface is fixed.]

10. The device of claim 8 in which said brake surface is fixed.

[11. The device of claim 1 in which said brake surface is rotatable.]

12. The device of claim 8 in which said brake surface is rotatable.

13. An anti-reverse mechanism comprising a pair of coaxial and rotative power input members, one of which provides a circular brake surface, a coaxial output member, and means to drive said output member from either of said input members while limiting feed-back of torque from the output member to either input member, said means comprising brake shoes releasably engageable with said brake surface, axially extending pins on one of said input members having operative wedging engagement with oversize holes in said shoes to release the latter from engagement with the brake surface, and means on said output member having engagement with said shoes under feed-back torque from the output member to urge the shoes against said brake surface.

14. The mechanism of claim 13 in which said last named means comprises at least one axially extending pin having a swivel connection to said output member, said last named pin acting between said shoes to exert a force couple thereon to engage the same against the brake surface.

15. The mechanism of claim 13 in which said last named means comprises a plurality of axially extending pins having a swivel connection to said output member, said last named pins acting between said shoes to exert force couples thereon to engage the same against the brake surface.

16. In a device of the type described, a first rotatable input member having a first brake surface of circular cross section, a second rotatable input member, a rotatable output member, said members having means providing a rotative drive of the output member selectively from one or the other of said input members, said means comprising an operating element operatively connected to one of said input members, and a force-transmitting element having a second brake surface movable radially into braking engagement with said first brake surface and being adapted to be actuated by said operating element, upon movement of the latter from a neutral position, said force-transmitting element being disposed to transmit force between said first input member and said output member at the respective brake surfaces of said first input member and said force transmitting element, said force transmitting element being actuable by said operating element, when the latter is moved from neutral position, to interrupt said force transmission and free said output member for driving rotation by said second input member, said first named means including means to transmit rotative driving force from said second input member to said output member, as thus freed, and means to restore said operating element to said neutral position upon termination of transmission of force from said second input member.

[17. An anti-reverse feed-back device, comprising means providing a circular brake surface, a rotary power input member coaxial with said surface and having a drive element in laterally spaced relation to the rotative axis thereof, a brake shoe releasably engageable in braking relation to said brake surface, said shoe being drivingly engaged by said element in a driving phase of said device, and a rotary power output member coaxial with said input member and having a brake control element in spaced relation to said rotative axis, said brake control element being engageable with said shoe to urge the latter to said braking relation in a phase of operation of the device in which the output member is under torque in a direction reverse of the direction of the input member and its element in said driving phase.]

[18. An anti-reverse feed-back device, comprising means providing a circular brake surface, a rotary power input member coaxial with said surface and having a drive element projecting axially therefrom in laterally spaced relation to the rotative axis thereof, and in a plane including said axis, a brake shoe releasably engageable in braking relation to said brake surface, said shoe being drivingly engaged by said element in a driving phase of said device, and a rotary power output member coaxial with said input member and having a brake control element projecting axially thereof in spaced relation to said rotative axis, said control element also being in a plane including said axis but at a 90° angle to said first named plane, said brake control element being engageable with said shoe to urge the latter to said braking relation in a phase of operation of the device in which the output member is under torque in a direction reverse of the direction of the input member and its element in said driving phase.]

19. A mechanism of the type described, comprising a pair of rotative power input members, one of which provides an arcuate brake surface, an output member, and means to drive said output member from said one or the other of said input members, said means comprising at least one brake member movable radially to releasably engage said brake surface and operatively coupled to the output member to provide a connection to drive the latter from said one input member in one phase of operation, control means moved by said other input member in another phase of operation to a position to release said brake member from engagement with said brake surface, thus interrupting said driving connection, and to drive said output member from said other input member, and means to return said control means from said brake release position to a neutral position upon termination of said other phase of operation.

20. A mechanism of the type described, comprising a pair of rotative power input members, one of which provides an arcuate brake surface, an output member, and means to drive said output member from said one or the other of said input members, said means comprising at least one brake member movable radially to releasably engage said brake surface and operatively coupled to the output member to provide a connection to drive the latter from said one input member in one phase of operation, control means moved by said other input member in another phase of operation to a position to release said brake member from engagement with said brake surface, thus interrupting said driving connection, and to drive said output member from said other input member, and means acting between said brake member and said other input member to return said control means from said brake release position to a neutral position upon termination of said other phase of operation.

21. The mechanism of claim 19, and further comprising means on said output member having engagement with said brake member under feed-back torque from the output member to urge said brake member radially against said brake surface.

*22. A device of the type described for the transmission of rotary power from an input member to an output member, comprising means connecting said input member to said output member for a normal drive of the latter under predetermined input member torque, means providing an annular brake surface, and shoe means adapted to brakingly engage said surface in a phase of operation of the device in which said output member is subject to torque predeterminedly in excess of the normal input member drive torque, said connecting means comprising at least one power transmitting element drivingly connected to and acting on or acted on by one of said input and output members in a rotative path about the axis of the device in the normal transmission of power between said members, said element acting on said shoe means otherwise than in said rotative path in response to said predeterminedly excessive torque to brakingly engage the shoe means with said braking surface.*

*23. The drive of claim 22, in which said shoe means comprises a pair of radially spaced shoe members disposed axially between said input and output members and radially outwardly engageable with said brake surface in said excessive torque phase.*

*24. The device of claim 23, in which there are a pair of said power transmitting elements extending axially between said shoe members on opposite sides of the axis of the device, said elements rocking against said shoe members in the excessive torque phase to spread the shoe members against the brake surface.*

*25. The device of claim 24, in which said elements are*

*elongated pins having socketed connection with said one of said input and output members to enable said rocking action of the pins against said shoe members.*

*26. The device of claim 25, in which said pins terminate axially of the other of said power input and output members.*

*27. The device of claim 26, and further comprising spring means normally urging said shoe members apart, said connecting means transmitting said normal drive of the output member upon compression of said spring means.*

*28. The device of claim 16, in which said restoring means resiliently biases said operating element relative to said force-transmitting element in restoring the operating element to the neutral position.*

*29. The mechanism of claim 19, in which said returning means resiliently biases said control means relative to said brake member in restoring the control means to the neutral position after said other phase of operation.*

*30. The mechanism of claim 20, in which said returning means resiliently biases said control means relative to said brake member in restoring the control means to the neutral position after said other phase of operation.*

*31. The device of claim 28, in which there are a pair of said force-transmitting elements, said operating element acting between said force-transmitting elements in interrupting said force transmission, said restoring means being resiliently biased directly against one of the power-transmitting elements in said transmission of rotative driving force from the second input member to the output member.*

*32. The mechanism of claim 29, in which there are a pair of said brake members, said control means acting between said brake members in releasing the brake members, said returning means being resiliently biased directly against one of the brake members in said drive of the output member from said other input member.*

*33. The mechanism of claim 30, in which there are a pair of said brake members, said control means acting between said brake members in releasing the brake members, said returning means being resiliently biased directly against one of the brake members in said drive of the output member from said other input member.*

References Cited

The following references, cited by the Examiner, are of record in the patented file of this patent or the original patent.

UNITED STATES PATENTS

| | | | |
|---|---|---|---|
| 1,617,745 | 2/1927 | Cousinard | 192—8 |
| 2,031,186 | 2/1936 | Still | 192—13 |
| 2,347,293 | 4/1944 | Smith | 192—8 |
| 2,359,010 | 9/1944 | Smith | 192—8 |
| 2,359,011 | 9/1944 | Smith | 192—8 |
| 2,394,384 | 2/1946 | Horstmann | 74—625 |
| 2,514,465 | 7/1950 | Bergsma | 192—8 |
| 2,881,635 | 4/1959 | Greene | 74—480 |
| 3,319,747 | 5/1967 | Lauper | 192—8 |
| 3,335,832 | 8/1967 | Candela | 74—480 |
| 1,972,359 | 8/1934 | Schenck | 77—34.3 |
| 2,365,877 | 12/1944 | Horstmann | 192—44 |

MARTIN P. SCHWADRON, *Primary Examiner.*

C. LEEDOM, *Assistant Examiner.*

U.S. Cl. X.R.

192—7; 188—134; 74—480, 483, 665, 625

Disclaimer

Reissue No. 26,540.—*Ilmars Kalns*, Taylor, Mich. BI-DIRECTIONAL NO-BACK DRIVE DEVICE. Reissue patent dated Mar. 11, 1969. Disclaimer filed May 16, 1969, by the assignee, *Formsprag Company*.

Hereby enters this disclaimer to claims 16, 19 and 21 of said patent.

[*Official Gazette October 14, 1969.*]